Aug. 22, 1961 J. WAGNER 2,997,569
ELECTRIC HOT AIR DOUCHE
Filed Oct. 2, 1958
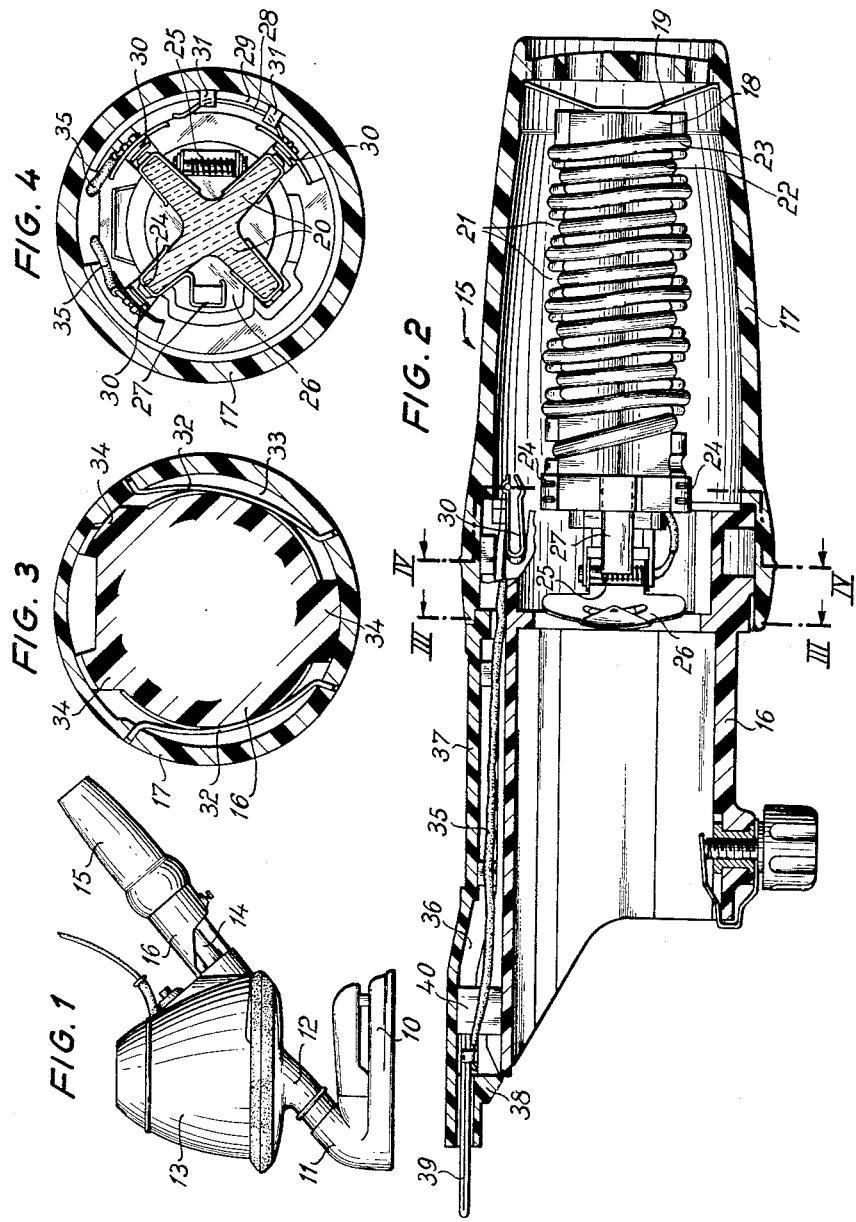
INVENTOR
Johannes Wagner
by:
Michael S. Striker
Attorney

United States Patent Office 2,997,569
Patented Aug. 22, 1961

2,997,569
ELECTRIC HOT AIR DOUCHE
Johannes Wagner, Wuppertal-Elberfeld, Germany, assignor to Vorwerk & Co., Wuppertal-Barmen, Germany, a firm
Filed Oct. 2, 1958, Ser. No. 764,928
Claims priority, application Germany Oct. 15, 1957
14 Claims. (Cl. 219—39)

This invention relates to an electric heater attachment for blowers, and more specifically to an auxiliary apparatus for an electric vacuum cleaner to be used as hair dryer.

Electric hot air douches have already become known in which an electric heating element is located in the current of compressed air and has a plurality of electric heating wires or sections of electric heating wires which can selectively be used to enable the temperature of the compressed air current to be adapted to actual requirements. These known constructions, however, do not meet all requirements in practice in a satisfactory manner because there is a danger of the electric heating wires or the sections of the electric heating wires being subjected to different loads, and, moreover, the control of the heating wires is inconvenient.

To overcome those disadvantages it is the object of the invention to produce an electric hot air douche, particularly an auxiliary electric heating apparatus which enables a vacuum cleaner to be used for this purpose, and in which, irrespectively of the heating stage actually switched on by a safe and simple manual operation, excessive heating of the electric heating wire or wires cannot occur.

According to the invention, an electric hot air douche comprises air moving means having an outlet; a stationary part attached to the outlet; a tubular part mounted on the stationary part for turning movement between a plurality of positions and projecting from the outlet so that air discharged from the outlet passes through a passage formed by the turnable tubular part, said turnable tubular part being adapted to be manually gripped and turned; electric heater wire means mounted on the stationary part located in the passage for heating the air; terminal wire means mounted on the stationary part and adapted to be connected to a source of electricity; contact means mounted on the stationary part and connected to the terminal wire means and to the heater wire means; and means on the inner surface of the turnable tubular part for operating the contact means when the turnable tubular part is turned between the positions.

By this arrangement it is ensured that the individual sections of the heating wire, which can be selectively switched on by a simple manual operation, are always located entirely in the compressed air current, so that the heat given off by one section of the heating wire cannot be influenced or impaired by the heat given off by another section of the heating wire. Furthermore, the location of the projection surfaces of the heating wire sections in relation to the direction of the air current results in a rapid heating of the through-flowing air so that, in spite of high speeds, the constructional length of the insulating carrier for the heating wire can be small. The heating wire sections are distributed wider over the cross section of the housing than heretofore and consequently present resistances to flow which slightly influence the speed of the air by contact with the heating wire, thereby improving the heat transmission.

The invention can be applied in a particularly simple manner to all common heating elements with heating wires which are wound, particularly in the form of a spiral, over elongated insulating carriers of star-shaped, preferably cruciform cross section, in that the sections of the heating wire have bearing zones with unequal distances from the longitudinal axis of the insulating carrier. Thus a plurality of independent ring-shaped projection zones of the heating wire located one within the other can be formed in relation to the direction of the air flow, so that a perfect flushing by the air to be heated is attained which prevents local overheating.

Such heating elements are particularly simple to make in that the sections of the heating wire are arranged extending substantially parallel to each other on the insulating carrier from a tapping point, i.e. the connecting point of electric feed wires. Absolute parallelism of the adjacent heating wire sections cannot usually be attained because a heating wire section wound on bearing zones at shorter distances from the longitudinal axis of the insulating carrier has a steeper pitch angle as compared with a heating wire section located farther out. This, however, does not influence the intensity of the flow of the air to be heated.

Hitherto switching means particularly in the form of tumbler switches were provided for electric hot air douches with selectively engageable different heating capacities. It is also known to provide a hot air douche with a motor which together with one of the heating current circuits is controlled with the aid of a ring-shaped switching device arranged in the housing wall of the douche. These forms of construction, however, require an extremely complicated wiring and frequently impair safe operation. These disadvantages are avoided in that according to an important feature of the invention the different heating stages can be selectively switched on by turning the housing part forming an air outlet passage and surrounding the heating wire and the insulating carrier thereof. By this means the special switching devices hitherto provided are dispensed with, in that its function is performed directly by a part of the housing which is necessary in any case. This results in a simplification of the construction of the hot air douche and the possibility of reliable wiring. In addition the manipulation is generally simplified because a large surface switching member is now available which can be reliably operated even under adverse circumstances.

It has already been mentioned that the use of a housing part, surrounding the heating wire and the insulating carrier thereof, as a switching device simplifies the wiring as compared with the known constructions. According to another feature of the invention, a switch bridge, slidable in a guide path extending transversely to the longitudinal direction of the insulating carrier within a stationary part of the housing, can be coordinated to connecting contacts located in the insulating carrier at the rear end thereof. This switch bridge is positively rotatably coupled with the rotary housing part by means of interengaging projections. Thus, the switching means are located directly within the range of the connecting contacts to be selectively switched on so that neither special connecting wires nor mechanical transmission means are necessary for the switching operations. Consequently the efficiency is improved and the construction of the hot air douche simplified considerably. The guide path coordinated to the switch bridge is preferably curved in arcuate shape in relation to the longitudinal axis of the insulating carrier so that the turning movement of the rotary housing part surrounding the heating wire and the insulating carrier thereof is directly utilized for the control. This construction is quite sufficient in the case of alternating current mains as here the formation of electric arcs is scarcely to be expected even in the event of slow switching movements. However, it would be possible also to control directly by the turning movement of the rotary housing part, forming also an air outlet passage, a switching arrangement producing rapid operation so that the apparatus can be operated with direct current without incurring danger.

The switch bridge forming a switching member and controlled by the rotary housing part can cooperate directly with the connecting contacts of the heating element. However, it is often preferable to provide contact members bearing on the one hand against the connecting contacts of the heating element and cooperating on the other hand with the switch bridge, these contact members being fitted in the stationary housing part and for this purpose constructed as substantially V-shaped contact springs. Such a construction is advantageous for series production of the apparatus because it enables splitting up all individual parts of the apparatus into sub-groups which can then be fitted together in a simple manner and quickly. Moreover, any necessary replacement of damaged parts is thereby facilitated.

The use of the rotary housing part surrounding the heating element as a switching device also leads to a particularly simple construction of the apparatus. The rotary connection of the rotary housing part, i.e. the air outlet passage forming the switching device, to the stationary part of the housing can be effected in a simple manner according to a further feature of the invention, in that the rotary housing part engages with its rear end over a collar on the stationary housing part and is secured in position for use by bow springs bearing against the face of the collar remote from the rotary housing part and forms at the same time abutments limiting the turning range and cooperating with abutments on the stationary housing part. Thus the rotary housing part is given a reliable longitudinal support which also compensates any deviations in the longitudinal dimensions of the relatively rotatable parts. In addition, the longitudinal support of the rotary part of the housing by spring members possesses the advantage of producing friction securing the parts in the actually adjusted position against unintentional displacement. However, independently thereof additional locking means might also be provided to hold the parts in the different switching positions.

The electric feed wires leading to the heating wire are, according to still another feature of the invention, preferably accommodated in a passage formed in the outer side of the housing and closed by a cover. Such an arrangement ensures maximum safety in operation and assists simple assembly. It is known, per se, to arrange electric feed wires for the heating element of a hot air douche in the housing wall during the manufacture of the housing. However, this presents technical difficulties in the manufacture and the wires permanently embedded in the wall of the housing can scarcely be tested or replaced in practice.

The aforementioned features of the invention can be introduced both in the case of hot air douches serving merely for hair drying and the like and also in the case of auxiliary apparatus for electric vacuum cleaners enabling their use as hot air douches. Such auxiliary apparatus, which consists substantially of an extension fixable on the pressure connection piece of a vacuum cleaner and containing a heating element, can be connected to the current feeding contacts of the vacuum cleaner by electric plug connections. Based on the arrangement according to the invention wherein the electric wires coordinated to the heating element are on the outside of the housing, preferably in a covered passage in the housing wall, the electric connecting means can be arranged in a particularly simple manner by providing in a transverse wall at one end of the cover coordinated to the passage, apertures in which plugs can be inserted which are mounted on the electric feed wires and, in fitted position, secured against backward movement by projections on the stationary housing part. By this means the plugs are firmly held and in addition the apparatus can be assembled in a simple manner because the electric feed wires can now be automatically fixed by the parts of the housing of the apparatus. Such a cover carrying the plugs of the feed wires can be secured for example on the side remote from the heating element by interengaging projections and at the other end by the rear end of the rotary housing part engaging over the cover and forming the switching device.

A preferred embodiment of the invention in the form of an auxiliary apparatus for an electric vacuum cleaner enabling said vacuum cleaner to be used as a hot air douche is illustrated by way of example in the accompanying drawing, in which:

FIG. 1 is a side elevational view of an electric vacuum cleaner with a heating apparatus fitted thereon for heating an air current;

FIG. 2 is a longitudinal section, on a larger scale, through the heating apparatus;

FIG. 3 is a cross section on line III—III of FIG. 2, and

FIG. 4 is a cross section on line IV—IV of FIG. 2.

In the drawing, FIG. 1 shows an electric vacuum cleaner 13 having a suction connection piece 12 and a pressure connection piece 14. A known foot or stand 10 provided with a socket 11 for detachably receiving the suction connection piece 12 of the vacuum cleaner 13 serves to support the vacuum cleaner 13. An auxiliary apparatus 15 is slipped on to the pressure connection piece 14 of the vacuum cleaner and comprises an electric heating element for heating the current of compressed air. The electric connection of said electric heating element is effected by plugs provided on the rear end of the auxiliary apparatus 15 and engaging in a correspondingly constructed socket on the vacuum cleaner 13.

The auxiliary apparatus 15 has a housing composed of two parts 16 and 17. The housing part 16 forms a sleeve capable of being slipped with one of its ends on the pressure connection piece 14 of the vacuum cleaner and is a so-called stationary housing part. On the free end of said part 16 the housing part 17 is rotatable and forms an outlet passage for the air current and at the same time serves as a switching device. The rotary housing part 17 is sleeve-shaped and accommodates the electric heating element mentioned above. This heating element may comprise an insulating carrier 18 composed of ceramic material and of cruciform cross section. At its rear end the heating element fits in a holder mounted on the front end of the stationary housing part 16. The heating element is held in this position by a bow spring 19 bearing on its free end face and constituting a yieldable clamping means, so that the heating element can yield to a great extent to thermal stresses. The insulating carrier 18 has ribs or arms 20 which are serrated on their outer edges and here form bearing zones 21 for a spirally wound heating wire. This heating wire is divided into two sections 22 and 23 which extend substantially parallel from a tapping point at the front end of the insulating carrier 18 to the rear end thereof. The two sections 22 and 23 of the heating wire are, as can be seen in FIG. 2, wound in such a manner that their projection surfaces in relation to the direction of the flow of compressed air, that is to the longitudinal axis of the housing parts 16 and 17, are mutually displaced. By this arrangement the air to be heated brushes uniformly all the zones of the heating wire. The four terminals of the two sections of the heating wire are connected to four connecting contacts 24 which are mounted on the arms 20 at the rear end of the insulating carrier 18. These connecting contacts 24 are preferably fixed on the insulating carrier 18 only by clamping. An automatic switch is provided in known manner on the rear end of the carrier 18 and only allows the heating arrangement to be switched on when an air current of sufficient strength is flowing through the housing parts 16 and 17. With this object in view a pivoted flap 26 loaded by a spring 25 in the opening direction is provided, which flap 26 cooperates with a counter contact 27. When the air current is of sufficient strength the flap 26 is pressed against the counter contact 27 against the action of the spring 25. The counter contact 27 is preferably mounted on one of the arms 20 of the insulating carrier 18.

A switch bridge 28, shown in FIG. 4, is provided for controlling the heating output and is slidable in a guide path 29 arranged within the housing and bent to correspond with the curvature of the stationary housing part 16. The switch bridge 28 has ends which cooperate with contact members 30 in the form of V-shaped contact springs slipped into recesses in the end face of the stationary housing part 16. These contact members 30 bear on the one hand directly against the connecting contacts 24 coordinated to them and on the other hand form contact surfaces which cooperate with the switch bridge 28. The switch bridge 28 engages by means of a projection between projections 31 on the rotary housing part 17 and is carried along with this part in the direction of rotation.

The turning range of the rotary housing part 17 is limited by free zones of bow springs 32 shown in FIG. 3, which springs, in fitted position, bear against the rear side of a collar 33 mounted on the stationary housing part 16, bearing surfaces for the bow springs 32 being formed by recesses defined in length by wall parts 34. The bow springs 32 can be slipped in under tension when fitting together the housing parts 16 and 17 and can be removed for separating said parts.

Accommodated in a passage 36 formed on the outer side of the stationary housing part 16 and closed by a detachable cover 37, are electric feed wires 35 which can be fixed directly on the corresponding connecting contacts 24 of the heating element. This is, however, unpractical for the assembly so that it is advisable also to provide springs like the contact members 30 to which the feed wires lead and which then establish the electrical connections with the connecting contacts 24 coordinated to them. The cover 37 has at one end a transverse wall 38 which is provided with apertures for receiving plugs 39 mounted on the feed wires 35, projections 40 formed on the stationary housing part 16 being provided to block the plugs 39 against unintentional backward movement. The plugs 39 are, for technical manufacturing reasons, formed from sheet metal strips sharply bent towards one another. With this arrangement the electric feed wires 35 can be connected at one end to the plugs 39 and at the other end to the contact members 30, independently of the housing parts. Therefore it is not necessary when assembling the apparatus to make electric connections by terminals, soldering or the like, it being possible merely to place the finished feed wires in the respective housing parts.

It will be apparent that the invention can also be employed in connection with electric hot air douches which are themselves intended for the purpose since also in this case the arrangement of the heating wire, the switch-over arrangement and the arrangement of the electric feed wires in passages accessible from the outer side of the housing, represent great advantages over the known constructions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. Heater attachment for a vacuum cleaner having an outlet for air, comprising, in combination, a stationary tubular part adapted to be attached to the outlet of the vacuum cleaner; a movable tubular part mounted on said stationary part for movement between a plurality of positions and projecting from said outlet so that air discharged from the outlet passes through a passage formed by said tubular parts; electric heater means including heater wire means and mounted on said stationary part located in said passage for heating the air; terminal wire means mounted on said stationary part and adapted to be connected to a source of electricity; switch means mounted on said stationary part and connected to said terminal wire means and to said heater wire means; and operating means on said movable tubular part for operating said switch means when said movable tubular part is moved between said positions.

2. Heater attachment for a vacuum cleaner having an outlet for air, comprising, in combination, a stationary tubular part adapted to be attached to the outlet of the vacuum cleaner; a tubular part mounted on said stationary part for turning movement between a plurality of positions and projecting from said outlet so that air discharged from the outlet passes through a passage formed by said tubular parts; electric heater means including heater wire means and mounted on said stationary part located in said passage for heating the air; terminal wire means mounted on said stationary part and adapted to be connected to a source of electricity; switch means mounted on said stationary part and connected to said terminal wire means and to said heater wire means; and operating means including an arcuate member mounted on the inner surface of said movable tubular part for operating said switch means when said movable tubular part is turned between said positions.

3. Heater attachment for a vacuum cleaner having an outlet for air, comprising, in combination, a stationary tubular part adapted to be attached to the outlet of the vacuum cleaner; a tubular part mounted on said stationary part for turning movement between a plurality of positions and projecting from said outlet so that air discharged from the outlet passes through a passage formed by said tubular parts; electric heater means including heater wire means and mounted on said stationary part located in said passage for heating the air; terminal wire means mounted on said stationary part and adapted to be connected to a source of electricity; switch means mounted on said stationary part and connected to said terminal wire means and to said heater wire means; guide means secured to said stationary part and extending in circumferential direction; an arcuate bridge member secured to the inner surface of said turnable tubular part and engaging said guide means to be guided by the same between a plurality of positions cooperating with said switch means for operating said switch means when said turnable tubular part is turned between said positions.

4. A hot air blower as set forth in claim 3 wherein said stationary part includes an insulating support of cross-shaped cross section and supporting said heater wire means, said insulating support having an axis coinciding with the turning axis of said turnable tubular part and being located within said turnable tubular part; and wherein said guide means is of part-circular shape and concentric with the axis of said support and of said turnable tubular part.

5. A blower as set forth in claim 4 wherein said switch means include substantially V-shaped contact springs, and contacts mounted on said insulating support connected to said heater wire means and cooperating with said V-shaped contact springs, said V-shaped contact springs being engaged by said bridge member during turning movement of said turnable tubular part to be displaced into engagement with said contacts.

6. Heater attachment as set forth in claim 3 wherein said electric wire means include two coils of cylindrical shape having different diameter, the turns of the smaller coil being located within the other coil and staggered with respect to the turns of the same.

7. A heater attachment as set forth in claim 3 wherein said stationary part has abutments on the outer periphery thereof; and wherein said turnable tubular part have a collar surrounding said stationary tubular part in the region of said abutments; and including arcuate leaf springs secured to said collar and located between same and said stationary tubular part and cooperating with said abutments to releasably arrest said tubular part in said positions.

8. A heater attachment as set forth in claim 3 wherein said stationary part is formed with a recessed channel on the outer surface thereof receiving said terminal wire means; and includes a cover for closing said recessed channel.

9. A heater attachment as set forth in claim 8 wherein said terminal wire means terminate in plugs; wherein said stationary part includes channels through which said plugs pass and abutments on which the ends of said plugs abut.

10. A heater attachment as set forth in claim 8 wherein said cover has a projecting portion projecting into said turnable tubular part.

11. Hot air blower comprising, in combination, air blower means having an outlet; a stationary tubular part attached to said outlet; a tubular part mounted on said stationary part for turning movement between a plurality of positions and projecting from said outlet so that air discharged from the outlet passes through a passage formed by said tubular parts; electric heater means including heater wire means and mounted on said stationary part located in said passage for heating the air; terminal wire means mounted on said stationary part and adapted to be connected to a source of electricity; switch means mounted on said stationary part and connected to said terminal wire means and to said heater wire means; and operating means including an arcuate member mounted on the inner surface of said movable tubular part for operating said switch means when said movable tubular part is turned between said positions.

12. Hot air blower comprising, in combination, air blower means having an outlet; a stationary tubular part attached to said outlet; a tubular part mounted on said stationary part for turning movement between a plurality of positions and projecting from said outlet so that air discharged from the outlet passes through a passage formed by said tubular parts; electric heater means including heater wire means and mounted on said stationary part located in said passage for heating the air; terminal wire means mounted on said stationary part and adapted to be connected to a source of electricity; switch means mounted on said stationary part and adapted to be connected to a source of electricity; switch means mounted on said stationary part and connected to said terminal wire means and to said heater wire means; guide means secured to said stationary part and extending in circumferential direction; an arcuate bridge member secured to the inner surface of said turnable tubular part and engaging said guide means to be guided by the same between a plurality of positions cooperating with said switch means for operating said switch means when said turnable tubular part is turned between said positions.

13. Hot air blower comprising, in combination, air moving means having an outlet; a stationary part attached to said outlet; a tubular part mounted on said stationary part for turning movement between a plurality of positions and projecting from said outlet so that air discharged from said outlet passes through a passage formed by said turnable tubular part, said turnable tubular part being adapted to be manually gripped and turned; electric heater wire means mounted on said stationary part located in said passage for heating the air; terminal wire means mounted on said stationary part and adapted to be connected to a source of electricity; contact means mounted on said stationary part and connected to said terminal wire means and to said heater wire means; and means on the inner surface of said turnable tubular part for operating said contact means when said turnable tubular part is turned between said positions.

14. Hot air blower comprising, in combination, air moving means having an outlet; a stationary part attached to said outlet; a tubular part mounted on said stationary part for turning movement between a plurality of positions and projecting from said outlet so that air discharged from said outlet passes through a passage formed by said turnable tubular part, said turnable tubular part being adapted to be manually gripped and turned; electric heater wire means mounted on said stationary part located in said passage for heating the air, said heater wire means including a plurality of heater wire sections; terminal wire means mounted on said stationary part and adapted to be connected to a source of electricity; contact means mounted on said stationary part and connected to said terminal wire means and to said heater wire sections and being operable to establish selected connections between said heater wire sections and said terminal wire means; and means on the inner surface of said turnable tubular part for operating said contact means when said turnable tubular part is turned between said positions.

References Cited in the file of this patent

UNITED STATES PATENTS

| | | |
|---|---|---|
| 901,871 | Blanchard | Oct. 20, 1908 |
| 1,376,971 | Qualman | May 3, 1921 |
| 1,661,553 | Baar | Mar. 6, 1928 |
| 1,703,551 | Singer | Feb. 26, 1929 |
| 1,781,542 | Engberg et al. | Nov. 11, 1930 |
| 1,985,136 | Amoo | Dec. 18, 1934 |
| 2,420,732 | Bichsel et al. | May 20, 1947 |
| 2,432,067 | Morse | Dec. 2, 1947 |